(12) United States Patent
Schonfeld et al.

(10) Patent No.: US 9,796,303 B1
(45) Date of Patent: Oct. 24, 2017

(54) INTEGRATED CHILD SAFETY SEAT

(71) Applicants: Lizbeth Schonfeld, North Miami Breach, FL (US); David Schonfeld, North Miami Beach, FL (US)

(72) Inventors: Lizbeth Schonfeld, North Miami Breach, FL (US); David Schonfeld, North Miami Beach, FL (US)

(*) Notice: Subject to any disclaimer, the term of this patent is extended or adjusted under 35 U.S.C. 154(b) by 0 days.

(21) Appl. No.: 15/289,048

(22) Filed: Oct. 7, 2016

(51) Int. Cl.
*B60N 2/26* (2006.01)
*B60N 2/30* (2006.01)
*B60R 22/10* (2006.01)
*B60R 22/48* (2006.01)
*B60N 2/00* (2006.01)
*B60R 1/00* (2006.01)
*B60K 35/00* (2006.01)
(Continued)

(52) U.S. Cl.
CPC ............... *B60N 2/26* (2013.01); *B60C 5/005* (2013.01); *B60C 9/00* (2013.01); *B60K 35/00* (2013.01); *B60N 2/002* (2013.01); *B60N 2/265* (2013.01); *B60N 2/30* (2013.01); *B60N 2/3081* (2013.01); *B60N 2/3084* (2013.01); *B60N 2/3086* (2013.01); *B60R 1/00* (2013.01); *B60R 1/008* (2013.01); *B60R 22/105* (2013.01); *B60R 22/48* (2013.01); *B60N 2002/4485* (2013.01); *B60R 2022/4866* (2013.01); *B60R 2300/8013* (2013.01)

(58) Field of Classification Search
CPC .......... B60N 2/26; B60N 2/265; B60N 2/002; B60N 2/30; B60N 2/3081; B60N 2/3084; B60N 2/3086; B60N 2002/4485; B60R 22/105; B60R 22/48; B60R 2300/8013; B60R 1/00; B60R 1/008; B60R 2022/4816; B60R 2022/4858; B60R 2022/4866; B60Q 5/005; B60Q 9/00
See application file for complete search history.

(56) References Cited

U.S. PATENT DOCUMENTS 2,584,481 A * 2/1952 Mast .................... B60N 2/3084
297/113
2,966,201 A * 12/1960 Strahler ............... B60N 2/3084
297/238
(Continued)

FOREIGN PATENT DOCUMENTS

CN 104149663 11/2014
DE 4213218 A1 * 10/1993 ........... B60N 2/3084
(Continued)

*Primary Examiner* — Laura Freedman
(74) *Attorney, Agent, or Firm* — Jacqueline Tadros; Jacqueline Tadros, P.A.

(57) ABSTRACT

An infant safety car seat seamlessly and permanently integrated into the bench seat between two adult seats or replacing the adult seats if more than one is incorporated into the vehicle. The child seat is sunken or not below and behind the vehicle bench and seat and safety harnesses are permanently installed to secure an infant in the safety seat. The seat adjusts to allow forward or rearward facing configurations suitable to different ages of the infant, from zero to eight years old. Security features are internally integrated to prevent the incidence of leaving an unbuckled and/or an unattended infant in a vehicle that includes some combination of a scale, hasps sensors in display and video monitor of cameras in screen.

9 Claims, 7 Drawing Sheets

(51) Int. Cl.
 *B60C 5/00* (2006.01)
 *B60C 9/00* (2006.01)
 *B60N 2/44* (2006.01)

(56) References Cited

U.S. PATENT DOCUMENTS

| | | | | |
|---|---|---|---|---|
| 4,540,216 A | * | 9/1985 | Hassel, Sr. | B60N 2/3084 297/112 |
| 4,596,420 A | * | 6/1986 | Vaidya | B60N 2/3084 297/233 |
| 4,756,573 A | | 7/1988 | Simin | |
| 4,913,498 A | * | 4/1990 | Forlivio | B60N 2/3084 297/238 |
| 4,943,112 A | * | 7/1990 | Law | B60N 2/3084 297/112 |
| 5,205,308 A | * | 4/1993 | Kendall | B60N 2/26 135/90 |
| 5,224,756 A | * | 7/1993 | Dukatz | B60N 2/3084 297/114 |
| 5,260,684 A | * | 11/1993 | Metzmaker | B60N 2/002 340/425.5 |
| 5,280,995 A | * | 1/1994 | Elton | B60N 2/3084 280/807 |
| 5,282,667 A | * | 2/1994 | Elton | B60N 2/3084 297/238 |
| 5,282,668 A | * | 2/1994 | Heussner | B60N 2/3084 297/114 |
| 5,332,284 A | * | 7/1994 | Elton | B60N 2/3084 297/238 |
| 5,332,292 A | | 7/1994 | Price | |
| 5,364,169 A | * | 11/1994 | Collins | B60R 22/3405 297/238 |
| 5,385,384 A | * | 1/1995 | Gierman | B60R 22/105 297/216.11 |
| RE34,868 E | * | 2/1995 | Vander Stel | B60N 2/3084 297/238 |
| 5,472,260 A | * | 12/1995 | Czapski | B60N 2/3084 297/112 |
| 5,498,062 A | * | 3/1996 | Holdampf | B60N 2/3084 297/14 |
| 5,524,962 A | * | 6/1996 | Fulgenzi | B60N 2/3081 297/236 |
| 5,568,959 A | * | 10/1996 | Weber | B60N 2/4613 297/238 |
| 5,601,334 A | * | 2/1997 | Marks | B60N 2/3084 297/233 |
| 6,773,123 B1 | * | 8/2004 | Hatchett | B60N 2/2821 248/464 |
| 6,918,631 B2 | | 7/2005 | Verbovszky | |
| 7,261,381 B2 | * | 8/2007 | Tsai | B60N 2/2812 297/238 |
| 7,284,792 B1 | | 10/2007 | Dabney | |
| 7,311,357 B2 | | 12/2007 | Gold | |
| 8,063,788 B1 | * | 11/2011 | Morningstar | B60N 2/002 180/271 |
| 8,322,788 B2 | | 12/2012 | Williams | |
| 8,870,282 B2 | | 10/2014 | Tew | |
| 9,189,943 B1 | | 11/2015 | Rambadt | |
| 9,266,535 B2 | | 2/2016 | Schoenberg | |
| 2004/0155515 A1 | | 8/2004 | Verbovszky | |
| 2005/0151844 A1 | | 7/2005 | Chiao | |
| 2007/0145799 A1 | | 6/2007 | Nakhla | |
| 2007/0170758 A1 | * | 7/2007 | Allen | B60N 2/0244 297/250.1 |
| 2010/0078976 A1 | | 4/2010 | Hou | |
| 2010/0133883 A1 | | 6/2010 | Walker | |
| 2013/0033373 A1 | * | 2/2013 | Thomas | B60N 2/002 340/457.1 |
| 2014/0118548 A1 | | 5/2014 | Veneziano | |
| 2016/0200250 A1 | | 7/2016 | Westmoreland | |

FOREIGN PATENT DOCUMENTS

| | | | | |
|---|---|---|---|---|
| FR | EP 0516495 A1 | * | 12/1992 | ......... B60N 2/3086 |
| JP | 02106448 A | * | 4/1990 | ......... B60N 2/3084 |
| JP | 04349040 A | * | 12/1992 | |
| JP | 04349041 A | * | 12/1992 | |
| JP | 05162574 A | * | 6/1993 | ......... B60N 2/2872 |
| JP | 06008764 A | * | 1/1994 | |
| JP | 06135274 A | * | 5/1994 | |
| JP | 06183291 A | * | 7/1994 | |
| JP | 07186799 A | * | 7/1995 | ......... B60N 2/3084 |
| JP | 07315092 A | * | 12/1995 | |
| JP | 2001130298 A | * | 5/2001 | |
| SE | WO 9203306 A1 | * | 3/1992 | ......... B60N 2/3084 |

* cited by examiner

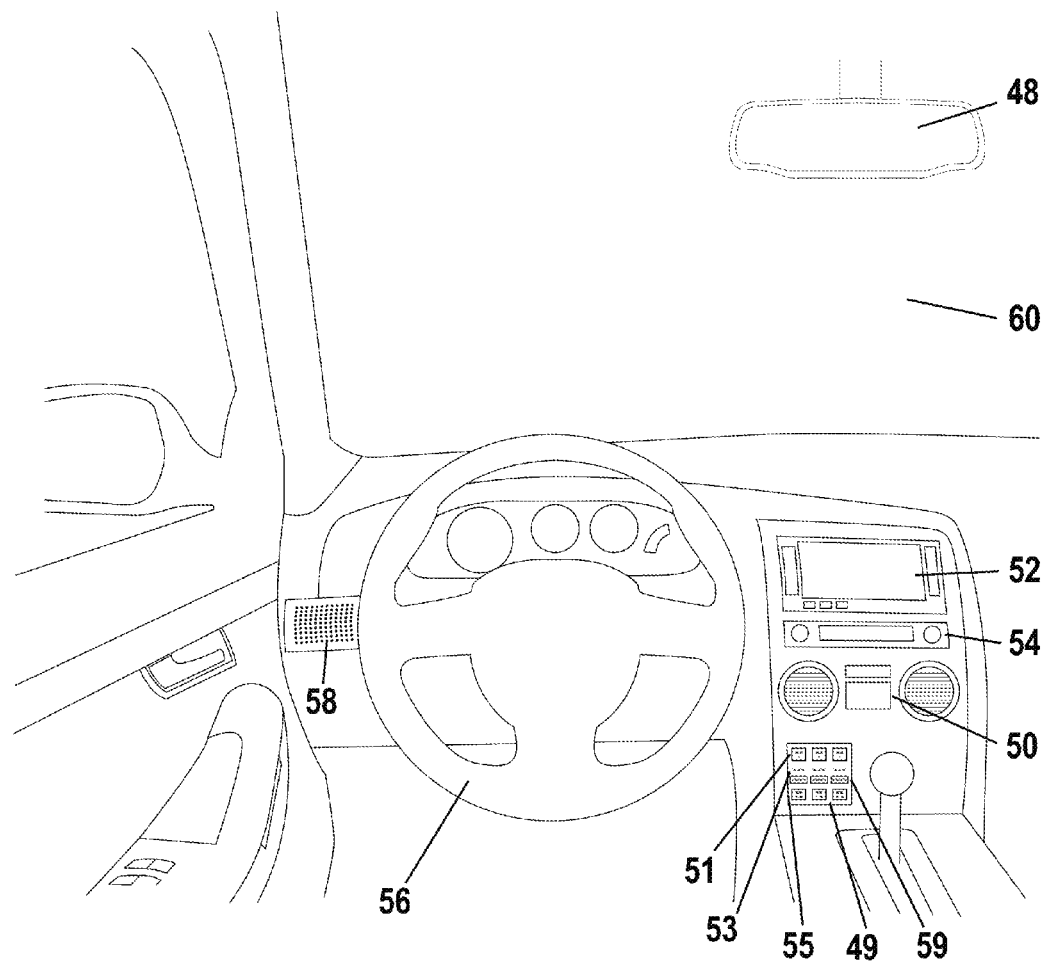
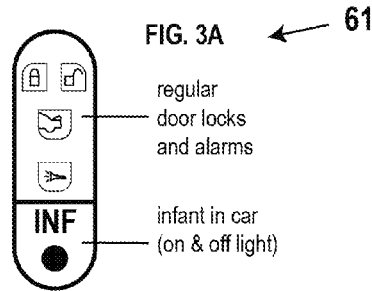
FIG. 3A
FIG. 3

INTEGRATED CHILD SAFETY SEAT

BACKGROUND OF THE INVENTION

1. Field of the Invention

The present invention relates to an integrated vehicle infant safety seat completely and seamlessly inserted as part of the upholstery of a car seat, for infants from zero to 8 years old, in two different positions and inclinations, who are travelling in a vehicle, and more particularly, to an infant safety car seat with all the security control features intertwined with one another integrated into the seat and reflected and controlled in the dashboard.

2. Description of the Related Art

Several designs for infant safety seats used in vehicles have been designed in the past. None of them, however, includes a seat or seats for an infant since the time he is born, until the ages of 6 to 8 years old, in the rear seat of a vehicle that is permanently a part of the vehicle's seat, with all the mechanisms invisible inside the internal parts of the car seat, and includes safety integrated features to ensure that the infant is travelling with the utmost protection as well as to prevent un-buckled infants or infant-left-in-car injuries and a monitoring system that allows a driver to focus attention forward on the road and also to view the infant without turning around.

Applicant believes that the closest reference corresponds to U.S. Pat. No. 4,756,573 issued to Simin. However, it differs from the present invention because while the Simin device is partially integrated with the vehicle, the infant carrier is similar to most baby car seats in use today and it is located externally on top or above a platform of the automobile front seat next to the driver, facing backwards, needing an attendant to look after the infant from the back seat.

In contrast, the integrated child safety seat (or seats) of the present disclosure includes, among other features, a seat for an infant permanently formed into the rear seat of a vehicle allowing a sturdier construction and absolute assimilation into the upholstery and aesthetic of the vehicle it was specifically adapted for. Other safety features to allow the driver to more securely monitor the infant and to prevent accidental injury from leaving an infant unattended, unbuckled or alone in a vehicle. In some cases some arts of detached seats facing backwards to the driver have an additional pole to secure the baby seat to the base of the car to try to avoid movement of detached seat, as well as a platform for the base of the detached car seat. The art in this patent avoids having to install these accessories, because the Integrated Infant Safety Car Seat is part of the car itself, therefore the infant secured to it is incorporated into a much more stable and safer system.

Another difference with the Simin art is that they have seats incorporated in the back seat but only for infants from 6 to 8 years old. Our art portrays an integrated infant car seat built in for an infant since the time he is a new born with 2 Positions for different growing stages of the infant, inclination of seats and head/foot rests separately, ensuring all his safety with electronic, digital or other security features that work intertwined installed as part of the Integrated Infant Safety Car Seat when the car is built.

The present design replaces the need to purchase detached seats for the different growing stages of the infant.

The integrated infant safety seat is ideal for the consumers that are starting a family or have children and feel the necessity of providing the highest safety and comfort to the infants at every stage of their development while traveling in cars.

The integrated infant safety seat is ideal for large vans or SUV's although the design also serves smaller vehicles ensuring the safety of all infants. This art will serve the market with advanced technological and novel improvements with a vision of present and future needs.

The difference of the other arts regarding the safety control features of the Integrated Infant Safety Car Seat is that all the controls are intertwined with one another and are an internal part of the seat. The safety control features are portrayed all together in a screen in the dashboard covering all the possible situations in order to ensure the safety of an infant in a vehicle. It beholds possibility of un-buckling an infant form the integrated safety car seat by a remote control in the display of the dashboard to facilitate the process of following the safety sequence of the controls before leaving the vehicle and not leaving an infant alone in car.

Other patents describing the closest subject matter provide for a number of more or less complicated features that fail to solve the problem in an efficient and economical way. None of these patents suggest the novel features of the present invention that integrates all the control systems together and incorporated into the car internally.

Most importantly, the infant will travel more safely when placed directly on a seat designed for his needs directly as part of the car seat and buckled securely, instead of being buckled to a seat that also requires buckling itself to the actual seat of the car which is more unstable, wiggly and unsafe, especially at the moment of an abrupt use of the brakes, or in a collision or accident.

The integrated infant safety car seat provides the assurance that the infant(s) in vehicles are completely safe, monitored and protected, by the ergonomic design of the art enhanced by all the security features it beholds.

SUMMARY OF THE INVENTION

It is one of the main objects of the present invention to provide an infant car safety seat including security devices that seamlessly meshes with the interior décor and upholstery of the vehicle into which it is installed.

It is another object of this invention to provide a safer infant car seat by integrating the infant seat into the structure of the vehicle seat instead of difficult to use and unreliable seat belts or other strap-in systems for detached car seat units.

It is still another object of the present invention to provide an integrated infant safety car seat that includes factory-installed (or other high quality integration) of monitoring features to prevent the occurrence of injury risks to the infant. These features contemplate a series of controls put together with a system that covers all the possibilities to ensure maximum safety.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 shows a perspective view of a vehicle dashboard demonstrating safety features in an integrated infant safety car seat.

DETAILED DESCRIPTION OF THE PREFERRED EMBODIMENT

Figure 1:
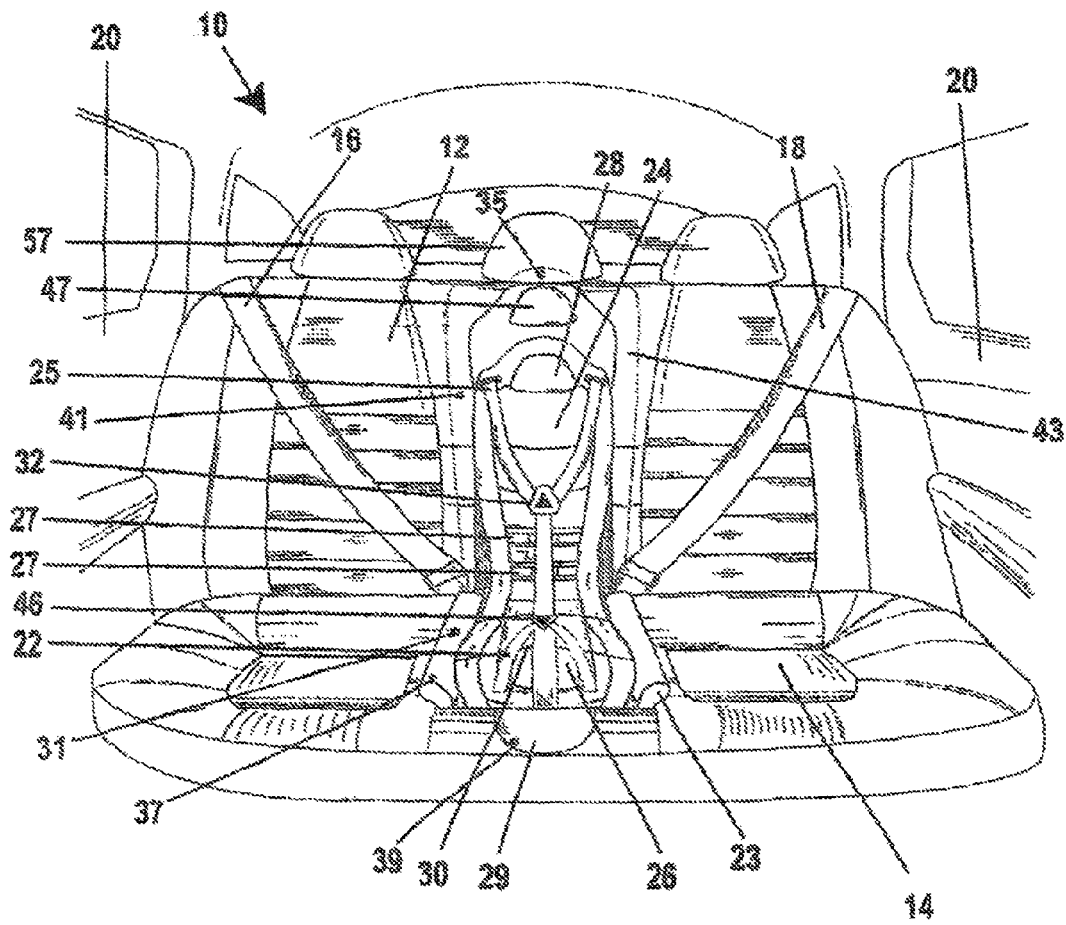
FIG. 1 shows a perspective view of a forward facing an integrated safety car seat.

The subject device and method of use is sometimes referred to as the device, the invention, the car seat, the safety seat, the integrated infant safety car seat, machine or other similar terms. These terms may be used interchangeably as context requires and from use the intent becomes apparent. The masculine can sometimes refer to the feminine and vice versa. The plural may include the singular and singular the plural as appropriate from a fair and reasonable interpretation in the situation.

Referring now to the drawings, where the present invention is generally referred to with numeral 10, it can be observed that it basically includes, among claimed and contextual elements, a back 12, a seat 14, a seatbelt 16, a seatbelt 18, a door 20, a harness 22, a hasp 46, a harness 25, a hasp 32, an arm-rest 23, an arm rest 43, a back 24, a seat 26, a head/foot rest 28, a head/foot rest 29, a head/foot rest 47, a head/foot 57, a button 31, a button 41, a button 39, a button 8, a button 7, a button 17, a scale 30, a back of head rest 34, a camera 35, a bench 36, a headrest 38, a back 40, a camera 42, a seat 44, a seat bottom 26 a lap-belt 27 and a hinge 33.

There are 2 positions provided to sit the infant in the Integrated safety seat:
Position Infant 1:
When the infant is seated with his head in the lower extreme of the seat, or his head laying in head/foot rest 29, facing the opposite direction of the driver or back-wards, when he is a small infant, from zero to two years old or below the mandatory weight established by the AAP (American Association of Pediatrics).
Position Infant 1: Head of Infant on head/footrest 29. Or below, in seat.
Position Infant 2:
When the infant is seated with his head in the upper extreme of the seat, or head rests 28,47 or 57, or below, facing the same direction of the driver or frontwards, when he is a bigger infant, from 2 years old and up, or above the mandatory weight established by the AAP.
Position Infant 2: Head of Infant on head/foot rest 28, 47 or 57 or below in seat.

Figure 2:
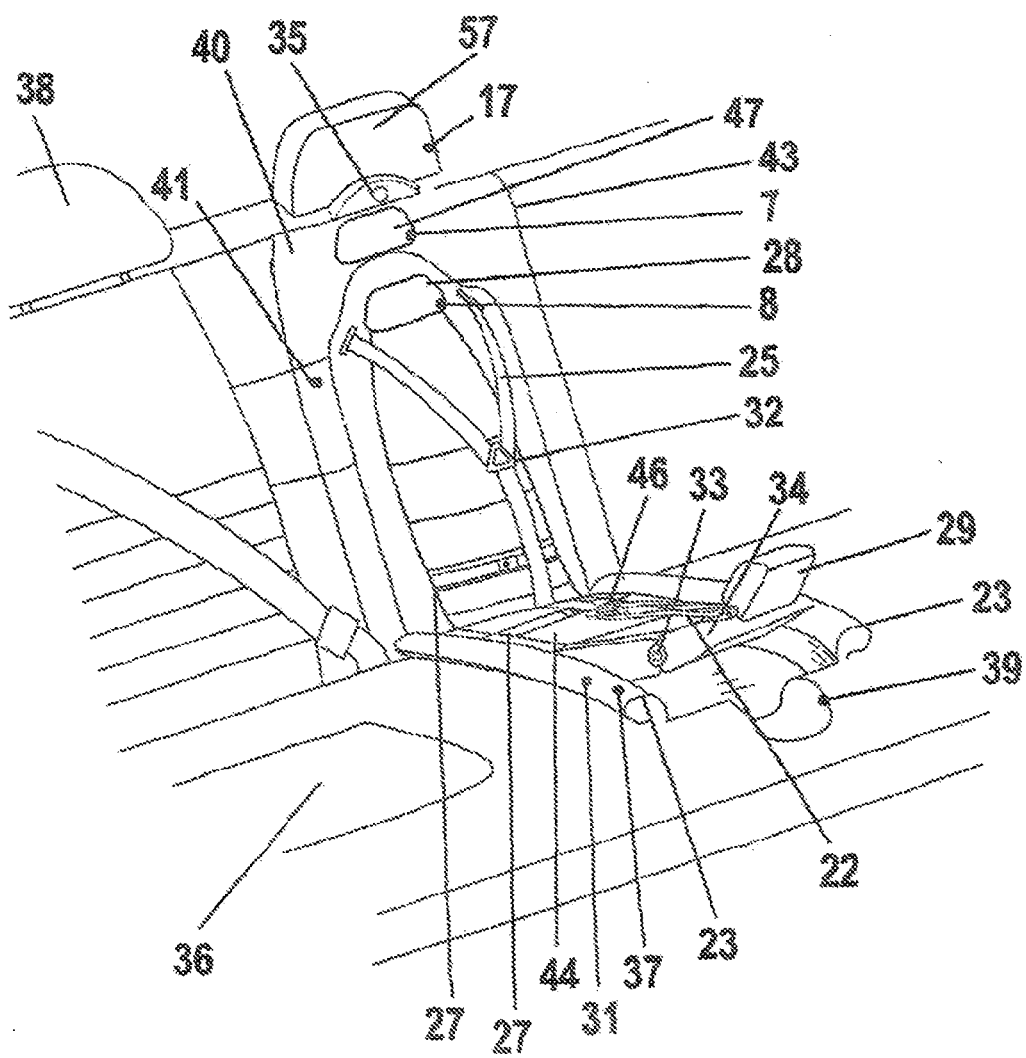
FIG. 2 shows a perspective view of a rearward facing version of an integrated infant safety car seat.
Figure 6:
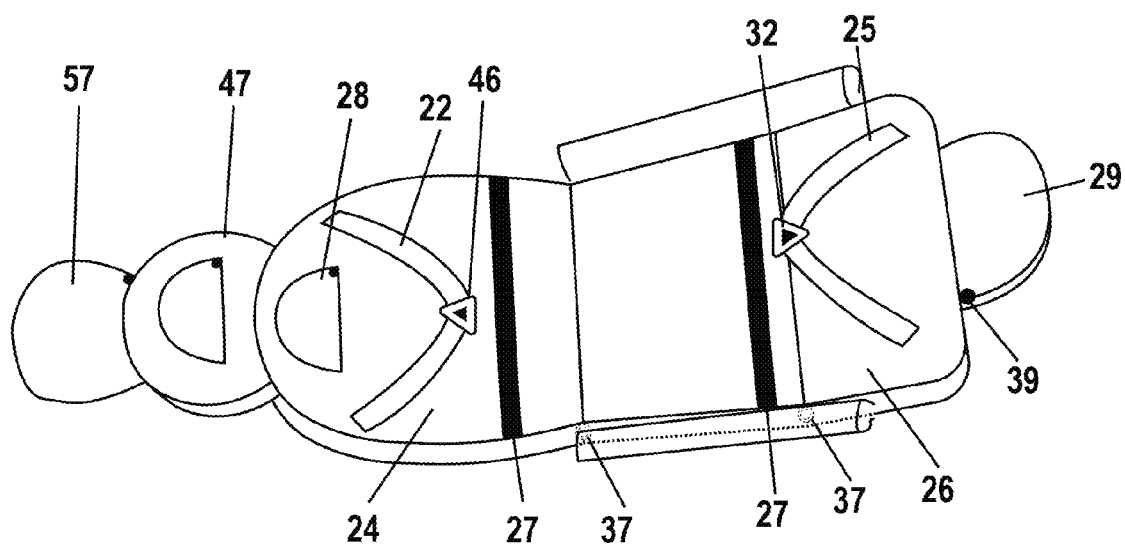
FIG. 6 shows a top rearward view of an integrated infant safety car seat with an elevated seat inclination.
Figure 7:
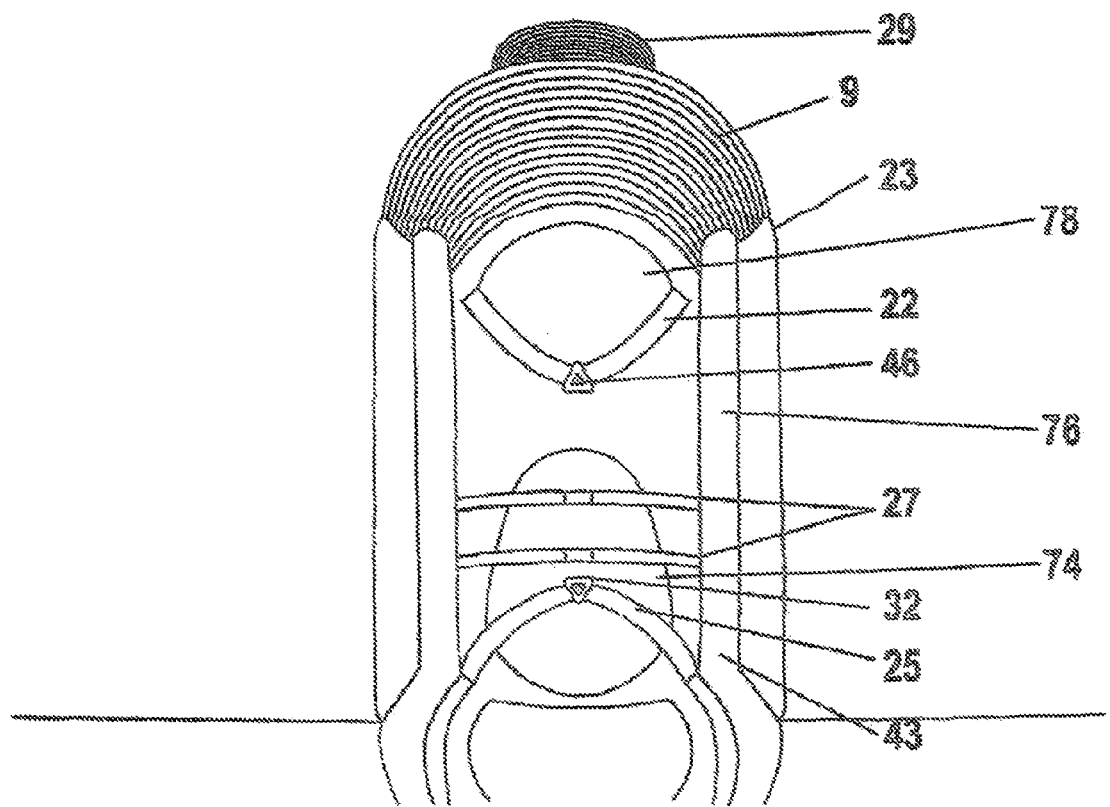
FIG. 7 shows a top and backward view of an integrated infant safety car seat when a newborn infant is placed in it, with canopy.

FIG. 1 is an example of how a front facing integrated infant safety seat may be positioned in the back seat area of a passenger vehicle. As in many vehicles the rear seat includes a back 12 and a seat 14 that span the width of the vehicle. A door 20 is shown for context. The infant integrated safety car seat is positioned on a middle third of the back 12 and seat 14 bounded by the left third and right third of the seat. There is a placement of newborns until 6 months as shown in FIG. 7, and progressively as the infant grows, the seat is adapted to his size by removable cushions that are part of the upholstery as shown in FIG. 1, FIG. 2, FIG. 6. The child safety seat could also be adapted to be positioned on the center third, left third or right third. There could be seats for older infants directly integrated, as an upgrade ordered when purchasing a vehicle.

The left third and right third of the rear bench seat are engineered for an adult to comfortably sit, or as expressed above, or for other integrated infant car seats, or for integrated safety car seats for older infants, which could be ordered as upgrades. A seatbelt 16 is provided for the right third. A seatbelt 18 is provided for the left, driver's side, rear seat position.

An important aspect of the invention is the child infant integrated into the upholstery and structure of the back 12 and seat 14 between the left and right third adult seats. The seat 26 of the child seat is structured below the surrounding seat 14 and the back 24 is structure inset into plane of the back 12. Equally, there may be one, two or three child safety seats across the rear car sear so that multiple children can be simultaneously transported or if the vehicle owner prefers to have child safety seats in any of the right, center or left positions.

When an infant is placed onto the seat 26 they can rest their back onto the back 24. The child's head can rest between the headrests 28. (Position Infant 2).

This may similarly, even for older children the headrests 28 may be leaned upon during rest or sleep to more comfortably support the child's head.

As an infant grows older from being a new-born (FIG. 7) to a toddler—zero to 2 years old (Position 1), (FIG. 6) and then to becoming an infant of 6 to 8 years old (FIG. 2), the same integrated infant safety car seat adapts to his age and size (Position Infant 2) of the Integrated infant safety car seat, and secured with the appropriate seat belts and protection devices for the upper body, such as cushions, and adaptable head/foot rests. The areas that provided additional protections to fit a small infant now expand to fit a growing child in all the stages of his development. Different levels of inclination of the extremes of the seat, as well as the head/foot rests, give an array of angles to enable comfort to the infant. Cushions and inner protectors are provided as part of the design to make the seat narrower and shorter or wider and larger, in at least 3 or 4 different sizes.

When the infant is zero to two years old, or is below the mandatory weight (Position Infant 1), he will be placed on the lower extreme of the infant car seat facing opposite to the driver. (Position Infant 1). The reclined head/foot rest will move forward with an automatic button 39 as well as at least one third of the lower extreme of the chair that moves with other button 37 placed on the arm rest 23 to raise upward in two other higher positions. The upper body of the baby is raised. There is side protection by the arm rests on both sides of the infant all along the Integrated Infant safety car seat, tall enough to provide a barrier or separation wall to give him protection. The height of these arm rests or separation side walls of the integrated infant safety car seat design may vary, from 5 inches and up. There are seat belts and buckling harness systems on along the integrated infant safety car seat. Some begin on both extremes (three point harnesses) of the seat, and some begin on the sides (lap-belts). The harnesses of these systems also have cameras connected to each of their hasps facing the infant according to the position. The three point harnesses part from the extremes of each position. (Position Infant 1: Harness 22, Hasp 46), (Position Infant 2: Harness 25, Hasp 32). When using either of them according to the position of the infant, the alternative one will be covered with cushion or protector. The Lap Belts part from the sides of each position, 1 and 2. (Position 1—Lap-Belt 27), (Position Infant 2—Lap-Belt 28). The Position Infant 1 opposite to driver is designed in the integrated infant safety car seat to abide by the law to protect the spine of the infants zero to two years old or below the mandatory weight in the event of a car collision or accident.

Two safety harnesses 22 (position 1) and 25 (position 2) are provided to secure the infant in the integrated safety seat on both extremes when he sits on either position. It has cameras which we name 35 for all cameras to see the infants face when sitting on either position reflected on the dashboard. This is effective during a collision as well as general purpose to keep the infant from unwanted movement about the vehicle during driving. A hasp 46 (position 1 and a hasp 32 (position 2) are provided to allow easy and effective entry and exit into the harnesses 22 (Position 1) and hasp 25 (Position 2) restraint systems.

As part of the electronic, digital or other safety features, a scale 30 is supplied as part of a safety system in the Integrated Infant safety Car Seat to avoid infant left unbuckled while car is in motion, as well as infants left in unattended vehicles. If a pre-determined weight is detected by the scale 30, which has sensors all along the seat of the Integrated Infant Safety Car Seat, then the monitoring system is on alert and awaiting additional signals to avoid these risks. The weight needed to activate the scale may be estimated to be that of the infant plus any gear the infant is likely to have. It is generally more than a few pounds. When adjusting it may be better to err on the lighter side and risk a false alert of an infant improperly left in the vehicle than to not trigger and risk human injury.

The cameras named 35 for all of them, may be located on or near the armrest or in the rear surface of the headrests of the front seat so that the child's face may be seen when facing forward. The cameras 35 may also be integrated into the hasp 46 and the hasp 32 to cover any of the two directions the infant is facing.

The integrated infant safety car seat provides the feature of inclination of the seat, on back 24 and seat 26. These numbers refer to the area for the back of a person sitting in a regular car seat (24) also called back, and, the area for lower body of a person when sitting in a regular car seat, also called bench. In an Integrated Infant Safety Car Seat, 24 and 26 serve as back placement and lower body placing alternatively according to the position of the infant (Position 1 or Position 2).

Button 37 will be located in one or both sides of the arm rest 23 and will control the inclination of 26 (being 26 the persons' sitting area of a regular car seat). For back 24, Button 41 will be located in one or both sides of the arm rests 43 and will control the inclination of the middle upper part of 24 as well as Button 31 will be located in one or both sides of the arm rests 43 and will control the inclination of the end upper part of 24 (being 24 the persons' back area of a regular car seat).

This button 31 will give an additional position of inclination on the extreme part of the seat to provide more angles for either a grown infants' upper body, when sitting in position 2, or a small infants' lower extremities, when sitting in position 1. The buttons 37 (Seat 26), and buttons 41 and 31 (Seat 24) are found in the middle and upper extremes of the arm rests (on one or both arm rests on the sides of the infant, that electronically or any other technological way, controls the recline of the Integrated Infant Safety Car Seat. In the example in FIG. 1 the button 37 is on a forward edge of the rear bench 26 seat but it could be located in any place convenient for the driver. The button 31, 41, and 37 may be a rocker switch (similar to the type used in many powered windows). All these buttons will have hinges, such as hinge 33 visible or not, to move the mechanisms of inclination, by any existent technology, such as in reclining chairs or mattresses available in the market. There will be internal hinges or devices that will correspond to all the inclination control buttons, and will move accordingly to the buttons pressed or manipulated with any technology, manual, electronic, digital or other. The internal mechanism of inclination that responds to the buttons will provide many different angles in all the parts of the integrated infant safety car seat, to provide adaptability and comfort for all the needs of the infant, in Position 1 and Position 2, as the infant grows from zero to 2, from 3 to 4, from 5 to 7 or 8 years old.

To control the inclination of the Head/Foot rests, which are Head/Foot Rests 29 when an infants' head is in position 1, in bench 26, which is the lower position of a regular car seat, the head/foot rest will have button 39. This head/foot rest 29 will move in different angles, including a 90 degrees angle downwards for when it is not in use. For the inclination of the three Head/Foot/Rests which are Head/Foot rests 28, 47 and 57, when the infants' head is in Position 2, in bench 24, which serve different accommodations for the head or feet of growing infants according to the position 1 or 2 of placement, Button 8 will control the inclination for head/foot rest 28. Button 17 will control the inclination of head/foot rest 47. Button 7 will control the inclination of head/foot rest 57. This may vary in terms of number of head-rests and buttons assigned for the inclination feature. The inclinations of the back or the bench controlled by the buttons will provide reclined back or benches positions of 30, 45 or 60 degrees. (Approx.).

The inclination of the head/foot rests could provide reclined positions of 40, 50 or 70 degrees, (Approx.). These inclination alternatives will adjust to the anatomy of the infant. In this sense, for Position 1, head-rest 29 together with foot rest 28, 47 or 57 and its inclinations accommodate an infant from zero to 4 years old.

At the same time, head rests 28, 47 and 57 together with foot rest 29 and its inclinations accommodate an infant from 2 to 4, 4 to 6 and 6 to 8 years old. The inclination mechanisms could have visible buttons, knobs, hinges, electronic or digital or any other technology, and be completely seamless or not, such as inclined mattresses, airplane seats, massage chairs, and others, on the market. The controls may also be in a separate control device in the hands of the driver or care giver to control from the front seat.

FIG. 2 is an example of a rear facing integrated infant safety seat. (Position Infant 1). In many situations, particularly for smaller children and infants, a rear facing seat is safer and is mandatory. Similar in inventive concept, the same seat seamlessly automatically elevates to upward positions with a button. Buttons 37 for bench 26 and buttons 41,31 for bench 24. It includes head/foot rests (29,28,47,57) that also elevate with the seat or independently to different angles by moving the buttons (39,8,17,7). There is side protection provided by arm rests on both sides (23,43). On both extremes there are buckling harness systems (22,25), and on both sides there are lap-belts 27. The Position 1 is opposite to the driver to abide by the law to protect the spine of infants zero to two years old or below the mandatory weight established by the A.A.P., in the event of a car collision. All the parts and buttons of the Integrated Infant Safety Car Seat work together and adjust to the needs of the infant while travelling in the vehicle since he is a newborn up to age 8 approximately.

In the Integrated Infant safety Car Seat the buttons to incline the seats are different than the buttons to incline the head/foot rests. The reason is to provide many more options to comply with the infants' absolute safety and comfort, proper positioning and needs, such as sleeping, drinking from a bottle, or keeping his upper body in a more vertical manner.

This ergonomic art in which the infant is placed in an integrated safety seat is a novel concept for the industry.

The head/foot rests at the extremes are extensions of the seat and back, making the seat and back longer, when we refer to 29 and 57, which means they are a prominent structure that serves as additional space to fit the infant in both positions, 1 & 2. Each of these two head/foot-rests may measure approximately 10 inches in height, which provides enough space for the head and neck of an infant.

In a front impact the infant is pressed into the back 26 uniformly to reduce injury from the collision. As with other variations of the device, if the seat 26 is slightly below the surface of the surrounding bench 36 then some side impact protection is also afforded. The shape of the back 24 and the seat 26 may be slightly concave to partially surround the child for additional side impact protection. Padding integrated into the seat 26 and the back 24 further enhance impact survivability performance. The shape of the back 24 and the seat 26 may be adjusted with an automatic button to transition between the upward and inclined positions of the safety seat (i.e. forward and rear facing configurations).

The Integrated Infant Safety Car seat has arm-rest 23 for Position Infant 1 on both sides of the infant, and arm-rest 43 for Position Infant 2 on both sides of the infant. The height of arm-rests 23 and 43 of approx. five inches and/or higher, will provide protection and stability to keep the infant in the lateral limits of the safety seat. The arm-rests may have orifices to hold bottles on each side. The vertical space at the lower end of the integrated infant safety car seat, which is perpendicular to the floor of the car may have an opened or closed compartment for dippers or blankets as well as any other small artifact that might be handy.

In the integrated infant safety car seat, the back 24 and seat 26 are seamlessly integrated into the seat 36 so that the contours, upholstery and texture match. This ensures that the safety seat is unified with the structure of the seat 36 both for aesthetics and safety by strengthening the structure together with the car. This is in contrast to the prior arts that straps external or independent detached infant car seats onto the rear seat with seatbelts or other available straps that connect to an attachment point.

For all the different adaptable parts that are presented in the Figure drawings of the integrated safety car seat, in order to satisfy the dimensions of a growing child in various stages, a three point harness 22 and a three point harness 25 may provide additional security for the child in any type of accident. This is re-enforced by the lap-belts 27. In this example a three point harness 22 and a harness 25 are shown. Other strapping systems or available types of child restraint systems and methods may be employed as regulated by jurisdiction.

A camera 35 is also optionally provided and directed to the back 24 where the infant would be secured into the safety seat. The camera 35 may be alternatively positioned in the head/foot rest 29 and 57 at the extremes of the integrated infant safety car seat, or other location where it can image the child in the seat. In a forward facing seat, such as seen in FIG. 1, the camera 35 may be in the rear side head/foot rest of the seat, facing the child. There may be multiple cameras 35 showing different angles or for direct viewing of forward or rear facing seat configurations. The associated displays may show multiple angles or can cycle through the differing perspectives of the cameras. For example, one camera can be on or near the rear bench facing forward to image a child in a rear facing configuration. A camera may also be on the child seat or on the rear of the front seats pointing back to view the face of a forward facing child. Cameras may also be integrated into the fastening mechanisms such as hasps (46 and 32) on both ends, or buckles, to provide a close up view of the infant strapped therein and also to visually verify that the buckle is latched. The camera should be positioned to view all aspects of the child and seat in any configuration of the seat or for an infant of any age and size.

FIG. 3 With regards to the safety features of the integrated infant safety car seat, they will all together be reflected in the dashboard, where a perspective view of an example of a dashboard is shown to include, among other features, a rearview mirror 48, a display 50, a screen 52, a radio 54, a steering wheel 56, a speaker 58 and a windshield 60.

All the safety features of the integrated infant safety car seat are incorporated with controls and tools accessible to the driver of the vehicle into which the system is installed.

All of them are reflected in the dashboard conveniently for the driver to monitor all the elements that comprise the utmost security of the infant(s).

The safety system of the integrated infant safety car seat is based on a series of detectors that are intertwined with one another and work together progressively in a sequence. This allows the driver and/or the caregiver to take action when required in every possible status confined to the safety of the infant.

These safety features of the Integrated Infant Safety Car Seat, reflected in the dashboard are:

Rear-view mirror—placed between the screen and the display. 50

Cameras showed in screen—in hasps and or other surrounding areas. 52

Display of electronic, digital, automatic or other internal signals: 49

Weight of infant detected by scale 30—INFANT IN SEAT. 51

Buckling Systems—harnesses and hasps BUCKLED. 53

Unbuckle button manually in the display for the driver. UNBUCKLE 59

Alarms and alerts of sounds and lights regular and intermittent. 51, 53, 55

Manual control: Infant left in car button—INFANT IN CAR. 55

Manual Key device connected to dashboard—INFANT IN CAR. 61

A rear-view mirror 50 is placed on the dashboard below the screen of the Cameras, as an additional feature to watch the child in the safety seat without requiring the driver to turn around to check on the infant, which could be a distraction and could lead to an accident.

Alternatively, the screen 52 that is part of the dash infotainment or navigation system can be used to show the data captured by all the cameras. The images captured by the cameras are selectively viewable from the front seat. If more than one infant is placed in a vehicle that contains more than one integrated infant safety car seat, then it will read, Camera 1, Camera 2, Camera 3. Similar to how a back-up camera will show the area behind the vehicle to aid the driver in safely backing up, the display 52 can be used for viewing the interior cameras as needed. When not monitoring the child, the display 52 may remain useful for its other traditional functionalities, like radio and navigation, or the screen can be split to show all these functions mentioned at once.

The scale 30 may provide data to the processor to aid in determining whether there is a child in the seat 26 or 24 or if the seat 26 or 24 is vacant. For example, infants with clothing may weigh from about three kilograms or more. Therefore, the processor and scale 30 combination is set to indicate an occupied seat if about two or more kilograms are detected on the scale 30. This would avoid having an occupied determination if a lighter blanket or some other gear is in the seat 26.

An unfortunately frequent contributor to child safety risk relates to leaving an infant un-buckled which refers to not being secured with fastening systems, both of the detached seat itself in the existing car seats in the market that are separate units to place in vehicles, as well as from the buckling system that holds the infant.

Infants have been injured when un-buckled from their car seat in the event of the vehicle stopping abruptly, speeding, and vehicle collision and accidents.

Often, infants have died from exposure to excessive heat and cold while alone in a car for protracted periods. An effective aid to avoid such tragedies should be included in all vehicles. Both situations, of infant left un-bucked and infants left in vehicles, are very common in daily life in which there are an overwhelming number of activities in which a small infant is travelling in cars, and drivers are distracted by the excessive use of cell phones when accessing or exiting a car, and while driving. The present design specifically adapted for use with young or non-verbal infants should preferably include automatic safety measures as part of the internal integrated safety system reflected on dashboard to avoid exposure or other injuries that can result from infants un-buckled and infants left in a vehicle.

In an integrated infant safety car seat, in addition to the inherent safety of securely strapping the child into the car seat with harnesses 25, and 22 there will be electronic protections included with the system to make sure the fastening of hasps is registered in the controls with sign BUCKLED 53.

This art presents the buckling safety feature as well as all other safety features reflected in dashboard as features that are internally connected to a seat for infants that is part of the car itself, built in when the vehicle is manufactured, not a detached car seat any other external artifact that are adapted or incorporated as an external feature or device connected in any technological way to an infant car seat that is detached.

In order to cover the situations in which the infant is left in vehicle, be it in the integrated safety seat or elsewhere in the vehicle, in other seats or standing, or in someone's lap and then forgotten, it will be indicated by the control in dashboard INFANT IN CAR 55. An infant protection system should include features and functionality that do not distract drivers while operating the vehicle.

Regarding the sign BUCKLED 53 in one embodiment of the invention the hasp 46 as part of the harness 22, and the hasp 32 as part of the harness 25 include a sensor to detect when the hasp 46 and the hasp 32 are closed and thereby likely to have a child strapped in the seat. The sensor can send data to a processor, for a hasp that is open or closed. This will be expressed in the display, as BUCKLED 53, accordingly to the light, illuminated or not, and this sign will also have an intermittent light if the previous button INFANT IN SEAT 51 that responds to the scale determines an infant is actually seated and actions of buckling need to be taken in BUCKLED 53.

If the car is on and moving then the processor can assume that the infant is buckled in an attended vehicle. Sensors may be attached to the engine control systems, speedometer, transmission or other car data source to determine with a reasonable degree of certainty whether the vehicle is attended or not when stopping or the ignition is turned off and therefore whether the infant is attended to or if they might be alone, INFANT IN CAR 55.

The cameras 35 in hasps 46, 32, or anywhere in the integrated infant safety car seat or elsewhere inside the vehicle may also play a role in the system to prevent infant left in car situations. All cameras 35, connected to hasps or elsewhere in the integrated Infant Safety Car seat, or other parts of the vehicle, along with the processor, may detect infant via movement, heat, facial recognition or other sense recognition information to provide a reasonable probability that a child occupies the seat 24 or 26. These sensors will be reflected in the screen 52.

Any individual or combination of the scale 30, camera 35 or hasp 32 and 46 sensors may be used to determine whether an infant is in the integrated infant safety seat. This information along with information from the vehicle indicating whether it is in motion, and therefore necessarily occupied by an infant attendant which could be the driver or a caregiver, is used to make a determination that the infant may be at risk of being unattended and at any other risk in the event of an abrupt stop, collision or accident. If a preset combination of parameters is determined to exist then an alert is generated to suggest to a driver or caregiver that the infant seat or other areas inside the vehicle where the infant might be should be examined to determine whether a risky situation is taking place.

The alert can be anything to signal to someone who may be able to verify the safety of the infant. The processor may be connected electronically to the speakers 58 and radio 54 to produce an audio alert or alarm. The system could broadcast through the speakers a tone, buzzer, noise or pre-recorded statement to the effect of: "check the car seat" or "infant potentially at risk" or a melody such as a lullaby.

The alert can also manifest as a light in the car or headlight, flashing an intermittent light in the display 49 in a particular button or signal, honking the horn, sending a text, disabling the car's ability to lock remotely (key fob) or other notification means alone or in combination with other means and types of alerts.

Figure 4:
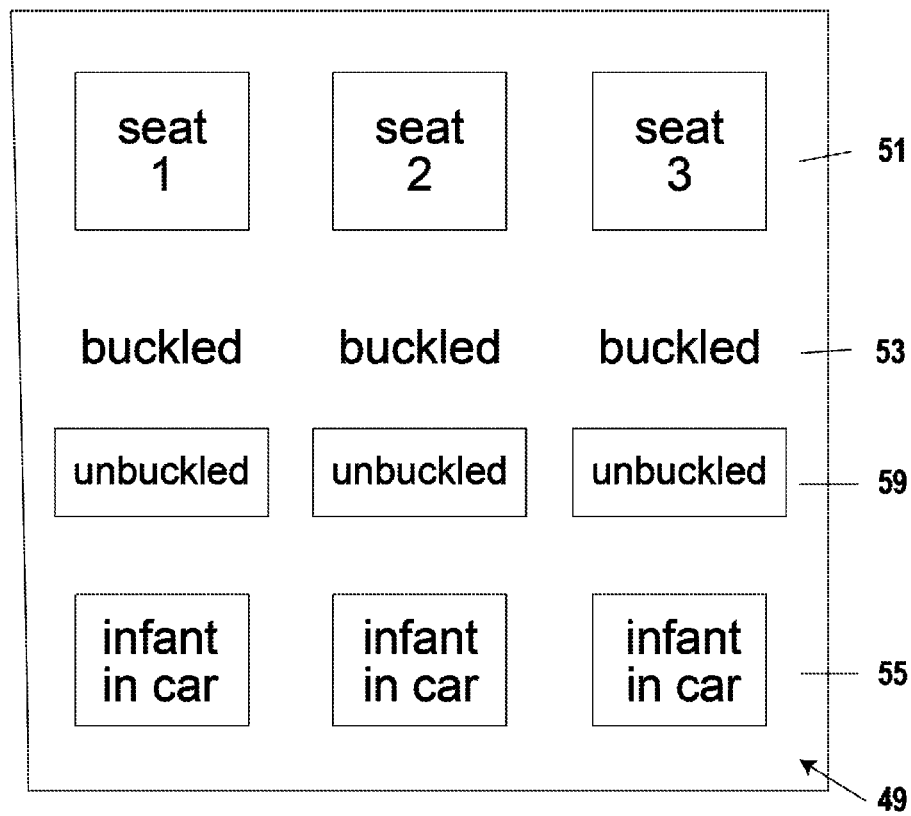
FIG. 4 shows all the security control elements in the dashboard of an integrated infant safety car seat.

FIG. 4 shows by way of example, to indicate the intertwined system of the safety features expressed in the dashboard of the design, this is one of the possible programmed actions or the art including all the security elements working together in a sequence, found in Dashboard Display.

The driver or caregiver places the infant in the Integrated Infant Safety Car Seat.

The driver or caregiver must buckle the infant at that moment.

(Three point harnesses 22 and 25, complemented by lap belts 27.

The driver sits in his driver seat and starts the car.

At the same time, the driver presses the button INFANT IN CAR 55 manually.

The light of this manually controlled button 55 is illuminated.

If the scale 30 determines that the infant is in the seat 26 and/or 24 then the light of the signal INFANT IN SEAT 51 is illuminated.

The feature INFANT IN SEAT 51 may also be activated in connection to the Cameras in the SCREEN 52, responding to the images captured by sensors.

When the light INFANT IN SEAT 51 is illuminated it internally transmits an indication to the sign BUCKLED 53 to become intermittently illuminated.

The light of the second sign BUCKLED 53 should be illuminated, because the driver or caregiver fastened the buckling system. In the case the driver of caregiver did not buckle the infant, then the sign BUCKLED 53 will have an intermittent light, accompanied by the alerting sounds described, such as a lullaby, voices, alarms etc. When the infant is buckled, the sign BUCKLED 53 is illuminated. A lullaby or other sounds are de-activated. The sign INFANT IN SEAT 51 remains lit.

When the vehicle is turned off, the sign BUCKLED 53 is intermittently illuminated.

A lullaby or other sounds are activated as a reminder to un-buckle the infant.

The sign INFANT IN SEAT 51 is illuminated.

The INFANT IN CAR is still pressed down with light.

When the infant is un-buckled, it can be done electronically with a button on the display to be pressed either manually UNBUCKLE 59 which will open the hasps 46 and 32 electronically by an internal mechanism connected to the action of pressing the button in the display, or directly on the buckling system of the seat. By unbuckling either way, the sign BUCKLED 53 is not Intermittent and is not illuminated.

The sign INFANT IN SEAT 51 is lit.

The sign INFANT IN CAR 55 still remains pressed down with light.

The sounds of a lullaby or other are activated as a reminder of INFANT IN SEAT 51 and INFANT IN CAR 55.

When the infant is removed from the seat by a caregiver, the sign INFANT IN SEAT 51 is not illuminated. The button INFANT IN CAR 55 remains lit. The sound of a lullaby or others are activated as a reminder to take the infant out of the vehicle.

When the driver is about to leave his seat, and he is the person that will remove infant from the seat once he is unbuckled electronically or manually, the driver presses the manual button INFANT IN CAR 55 out, a lullaby or other sounds are a reminder that the infant is in car. The driver will have a remote control in his car keys pressing down infant in car so the sound of lullaby or others are de-activated and he may lock the vehicle.

Figure 5:
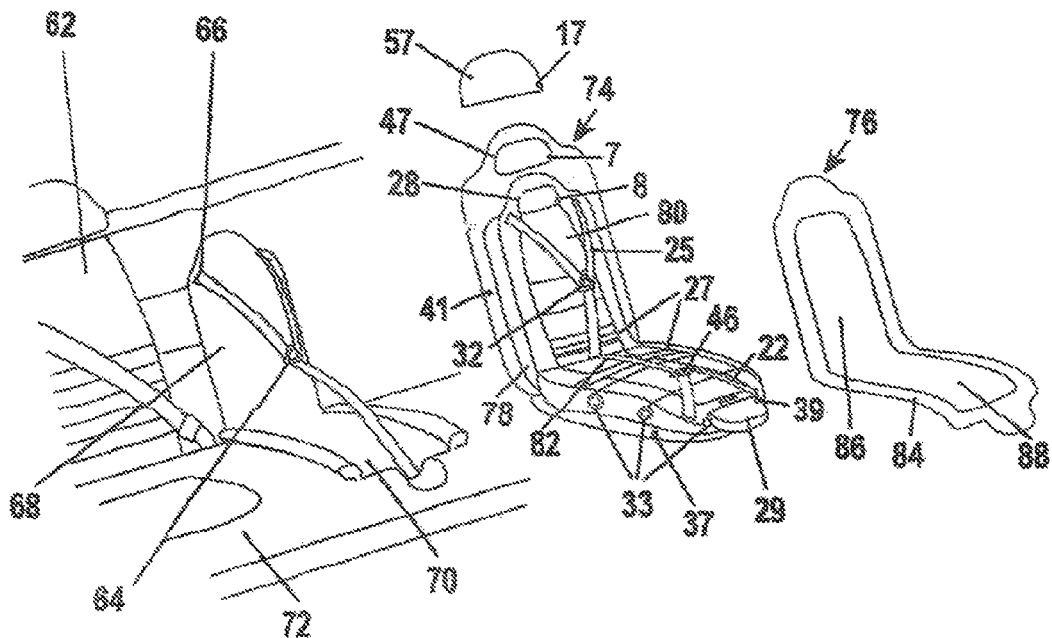
FIG. 5 shows a perspective view of an integrated infant safety seat optional elements.

FIG. 5 shows some optional elements that may be included in an integrated infant safety car seat, including a bench 62, a harness 64, an adjuster 66, a back 68, a seat 70, a seat 72, an insert 74, an insert 76, a padding 78, a back 80, a seat 82, a padding 84, a back 86 and a seat 88. a head/foot rest 29, a head/foot rest 28, inclination control button for seat 37, inclination control button for back and back 41, inclination control button 39 for head/foot rest 29, inclination control button 31 for head/foot rest 28, hinge 33, harness 22, hasp 46, harness 25, hasp 32, lap belts 27.

The hinge 33 laterally bisects the child seat to adjust the tilt or recline of the seat. By lifting the forward end with headrest 29 the seat becomes rear facing. Lowering the headrest 29 end essentially turns that headrest 29 functionally into a footrest. It bends vertically downward to 90 degrees when not in use, and not visible and does not take space when bent down through inclination button. The rear end of the seat terminating in headrest 28 may also have integral hinges to recline the headrests 28,47 and 57 so that headrest 28,47 and 57 act as a footrest when the seat is configured for rear facing seating. When the head/foot 29 rest is in use, it provides the necessary space to accommodate the infants head and neck, giving enough elongated extension for an infant to sit comfortably as he grows.

The adjusters 66 can move the top point of the harness 64 to accommodate a growing infant or with the addition of inserts 74 or 76 that tend to reposition the child in the seat 70.

With a seat 70 integrated into the form of the bench 62 and seat 72, the seat 70 and back 68 may be below the surface of the surrounding surfaces. Without any inserts this might be dimensioned for a larger infant not yet ready to be secured onto a traditional adult seat.

An insert 74 may be used alone on the seat 70 and back 68. It may also be used with insert 76 nested inside insert 74 to further diminish the size inside the safety seat for yet a smaller infant. The inserts 74 and 76 are individually removable to accommodate growing infants so that the safety seat may be used for several years of infants' development through the time when they will be able to use a regular adult harness and seatbelt traditionally in cars and light trucks.

The insert 74 may further include a back 80 and a seat 82 that rest on the back 68 and seat 70, respectively. Padding 78 may be supplied around the periphery of the insert 74 to fill in the space to make it suitable for smaller infants, generally under about two years of age. A head/foot rest can also be integrated into the insert 74 at either end for forward or rear facing configurations.

The insert 76 may nest inside the insert 74 that is nested inside the back 68 and seat 70 of the car seat bench 62 and seat 72. Optionally, the insert 76 may directly fit onto the seat 70 and back 68 without the intermediate insert 74. A back 86 and seat 88 are surrounded by padding 84 to protect and cushion the infant.

The armrests 23 and 43 may surround the periphery of the seat to provide all around protection. Similarly, the padding 78 and padding 84 may surround the inserts to provide protection completely around the infant in case of an accident. All the cushions, paddings and protector are from the same fabric as the upholstery and belong to the upholstery, detachable or not.

FIG. 6 shows a top and backwards view of the Integrated Infant Safety Car Seat, in which head of infant is facing opposite to the driver, between zero and 2 years old, or below mandatory weight, as well as an infant 3 to 4 years old (position 1). The infants' head lays on head/foot rest 29, bench 24, back 26, head/foot rest 57, a head/foot rest 47 an arm-rest 23, an arm rest 43, harness 22, a hasp 46, a harness 25, a hasp 32, lap rests 27, Button 39.

FIG. 7 shows a top rearward view for newborn infants, from zero to the age of 6 months approx. The infant lays in the seat 26, in Position Infant 1. The infant's head may be in the seat 26, or in the head/foot rest 29. There is a canopy 9 that covers the seat bottom 26, and it is attached on the sides of arm-rests 23. The top of the canopy 9 is also attached to the base of the head/foot rest 29. The canopy 9 allows the newborn infant to sleep comfortably being sheltered from noise and light. The canopy 9 is made with the same fabric as rest of the upholstery and it could be opened and closed in an accordion shape.

There is padding 78 for the newborn infant, and insert 74 and 76 to protect and reduce the space that contains him, arm rest 43, harnesses 22 and 25, hasps 46 and 32, lap belts 27.

An important version of the inventive concept can be fairly generally described as an infant seat built into a bench seat in a vehicle. The bench seat on a right segment has a first seat and a first back sized for normal adults. The first seat and the first back are dimensioned to support an adult. The bench seat on a left segment has a second seat and a second back. The second seat and the second back are dimensioned to support an adult. A medial (center seat) segment of the bench seat has a third seat and a third back. The third seat and third back are dimensioned to support an infant too small for an adult seat. The third seat is permanently integrated with the bench seat between and below the first seat and the second seat. The third back is permanently integrated with the bench seat between and behind the first seat and the second seat. The bench has a first upholstery that matches and smoothly integrates the third seat with the first seat and second seat. The bench has a second upholstery that matches and smoothly integrates the third back with the first back and the second back. Both seat and bench are reclined with buttons, as well as head/foot rests also reclined with buttons. There is a canopy attached to arm rests and head/foot rest to protect the newborn baby. There are inserts and padding to cushion and limit the spaces. A camera is directed to the third back to view the infant (s) seated there. A screen is positioned visible to a forward facing driver of the vehicle. The screen selectively shows an image from the camera(s). The third seat includes an integral scale. A harness with a hasp is provided to secure an occupant of the third seat. The hasp includes a sensor to determine whether the hasp is closed. A processor is connected to a sensor that determines whether the vehicle is in operation based on any of: a speedometer, a transmission or an engine computer. If the processor determines that the vehicle is not in operation and the scale indicates to the processor a preselected threshold weight and the hasp sensor indicates closed then an alert is made. A display is positioned visibly to a forward facing driver of the vehicle. The display shows the signals of the scale, the hasps and the vehicle in operation, as well as a reminder that an infant is in the car, and an unbuckling electronic remote button internal feature of the built in car seat. Optionally, an insert is provided that is adapted to fit within the third back and third seat to reduce the available size of the third back and third seat to fit a smaller infant. Optionally, the alert is any individual or combination of: a light, a display, a sound, disabling of a vehicle system or a wireless message.

A version of the invention can be fairly described as an integrated infant safety car seat built into a bench seat in a vehicle. The bench seat on a right segment has a first seat and a first back. The first seat and the first back are dimensioned to support an adult. The bench seat on a left segment has a second seat and a second back. The second seat and the second back are configured to support an adult. A medial segment of the bench seat has a third seat and a third back. The third seat and third back are configured to support an infant too small for an adult seat. The third seat is permanently integrated with the bench seat between and below the first seat and the second seat. The third back is permanently integrated with the seat between and behind the first seat and the second seat. The bench has a first upholstery that matches and smoothly integrates the third seat with the first seat and second seat. The bench has a second upholstery that matches and smoothly integrates the third back with the first back and the second back. A seat in all the positions and sizes has inclinations on both extremes of the seats and benches, in different positions and angles for different ages and sizes with a control button. A head/foot rest on each extreme of the integrated safety seat is an extension of the seat, therefore providing more space for infant that inclines to different angles by a control button. A canopy for the newborn infants. A camera is directed to the third back and another set of cameras are in hasps of harnesses and/or elsewhere. A screen is positioned visible to a forward facing driver of the vehicle. A display with inner and also manual signs is positioned visible to a forward facing driver. The screen selectively shows an image from the cameras. The third seat includes an integral scale as an internal part of the integrated infant safety car seat that is part of the vehicle. The harnesses with hasps are provided to secure an occupant of the third seat. The hasps include sensors to determine whether the hasps are closed. A processor is connected to the sensors that determine whether the vehicle is in operation based on any of: a speedometer, a transmission or an engine computer. If the processor determines that the vehicle is not in operation and the scale indicates to the processor a preselected threshold weight and the hasp sensor indicates closed then an alert is made. A processor indicates if infant is in car connected to safety seat. A processor indicates if infant is in safety seat, connected to safety seat. A processor indicates if infant is buckled connected to integrated infant safety car seat. A processor activates lights, sounds and alarms connected to integrated infant safety car seat. A processor unbuckles the hasps remotely and internally from the display, connected internally to integrated infant safety car seat. A processor is installed in key device for Infant in car, connected to the integrated infant safety car seat internally. The integrated infant safety car seat has adaptable positions facing the driver and opposite to the driver, with inclinations of benches and back as well as head/foot rests that also independently incline to different angles. Optionally, the integrated infant safety car seat further has an insert and padding that are adapted to fit within the third back and third seat to reduce the available size of the third back and third seat to fit a smaller infant. Optionally, the alert is any individual or combination of: a light or an intermittent light in the display, a sound, disabling of a vehicle system or a wireless message internally connected to the integrated infant safety car seat. Optionally the third seat and back are provided with a mechanized recline to convert the third seat from forward facing to rear facing.

Another version of the device embodied in its inventive concepts may be fairly described as an integrated infant safety car seat built into a bench seat in a vehicle. A segment of the bench seat has a seat and a back. The seat and back are configured to support an infant, from a newborn to a toddler or under the age of 8 who is too small for an adult seat. The seat is permanently integrated with the bench seat below a seat surface of the bench. The back is permanently integrated with the bench seat behind a back surface of the bench. The bench has a first upholstery that matches and smoothly integrates the seat with the bench. The bench has a second upholstery that matches to smoothly integrate the back with the back surface of the bench. A camera is directed to the back. Other cameras are in hasps and elsewhere in integrated seat and vehicle. A screen is positioned visible to a forward facing driver of the vehicle. The screen selectively shows an image from the cameras. A display is positioned visible to a forward facing driver of the vehicle. The display has electronic and manual control signals.

A display is positioned visible to a forward facing driver of the vehicle; all the safety features are reflected in the display. The integrated infant safety car seat includes an integral scale. Harnesses with hasps are provided to secure an occupant of the seat, internally connected to the integrated infant safety car seat. The hasps each include a sensor to determine whether the hasps are fastened; a processor is connected to a sensor that determines whether the vehicle is in operation based on any of: a speedometer, a transmission or an engine computer. If the processor determines that the vehicle is not in operation and the scale indicates to the processor a preselected threshold weight and the hasp sensor indicates closed then an alert is made. Electronic signs of infant in seat, and infant buckled are reflected in the display, which are internally connected to the integrated infant safety car seat. Manual sign of Infant in Car, is reflected in the display, internally connected to the integrated infant safety car seat. Electronic button to un-buckle, is reflected in the display, internally connected to the infant safety car seat. Electronic control of Infant in Car in key device is internally connected to Integrated Infant Safety Car Seat. Lights, intermittent lights, sounds such as a lullaby or other alerts are activated and de-activated according to status of the infant in vehicle, the actions taken, and the control signs, internally connected to the infant safety car seat. Optionally, an insert and paddings are provided that are adapted to fit within the back and seat to reduce the available size of the back and seat to fit a smaller infant. Optionally, the alert is any individual or combination of: a light, a display, a sound, disabling of a vehicle system or a wireless message. Optionally, the bench seat includes more than one integrated infant safety car seat. Optionally, the seat and back are provided with a mechanized recline to convert the seat from forward facing to rear facing, with head/foot rests that also recline in different angles.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An integrated infant safety car seat built into a bench seat in a vehicle;
   the bench seat on a right segment has a first seat and a first back;
   the first seat and the first back are configured to support an adult;
   the bench seat on a left segment has a second seat and a second back;
   the second seat and the second back are configured to support an adult;
   a medial segment of the bench seat has a third seat, which includes a third seat bottom and a third back;
   the third seat bottom and third back are configured to support an infant too small for an adult seat;
   the third seat bottom is permanently integrated with the bench seat between and below the first seat and the second seat;
   the third back is permanently integrated with the bench seat between and behind the first seat and the second seat;
   the bench seat has a first upholstery that matches and smoothly integrates the third seat with the first seat and second seat;
   the bench seat has a second upholstery that matches and smoothly integrates the third back with the first back and the second back;
   the third seat bottom and third back incline in different positions and angles for different ages and sizes with a control button;
   a headrest which may serve as a footrest, of the third seat bottom and the third back is an extension of the third seat;
   a canopy is provided over the third seat bottom and configured to protect an occupant;
   a first camera is directed to the third back;
   a second camera is in a hasp connected to a harness;
   a display is positioned visible and configured to a forward facing driver of the vehicle;
   the display having manual signs is positioned visible and configured to the forward facing driver;
   a screen selectively shows an image from any of the cameras;
   the third seat includes an integral scale as an internal part of the integrated infant safety car seat that is part of the vehicle;
   the harness with the hasp is configured to secure an occupant of the third seat;
   the hasp includes a sensor to determine whether the hasp is fastened;
   a processor connected to the display determines whether the vehicle is in operation based on any of: a speedometer, a transmission or an engine computer;
   if the processor determines that the vehicle is not in operation and the scale indicates to the processor a preselected threshold weight and the hasp sensor indicates fastened then an alert is made;
   a button in the display is configured to indicate if an infant is in the vehicle or in the integrated infant safety car seat;
   the scale is configured to determine and send to the display an indication if an infant is in the integrated infant safety car seat;
   the sensor in the hasp of the harness is configured to indicate in the display if an infant is buckled in the third seat bottom;
   the processor activates an alert, which may include any one or more of lights, sounds or alarms, connected to the integrated infant safety car seat;
   a button in the display can unbuckle the hasp of the harness of the integrated infant safety car seat;
   a key fob is wirelessly connected to the display to activate the alert;
   the integrated infant safety car seat is configured to have adaptable positions facing the driver and opposite to the driver, with inclinations of the third seat bottom and third back as well as the headrest, which may also serve as the footrest, which also independently incline to different angles.

2. The integrated infant safety car seat in claim 1 further characterized in that an insert and padding are provided that is adapted to fit within the third back and third seat bottom to reduce the available size of the third back and third seat bottom configured to fit a smaller infant.

3. The integrated infant safety car seat in claim 2 further characterized in that the alert is any individual or combination of: a light, an intermittent light in the display, a sound, disabling of a vehicle system or a wireless message internally connected to the integrated infant safety car seat.

4. The integrated infant safety car seat in claim 3 further characterized in that the third seat bottom and the third back are provided with a mechanized recline to convert the third seat from forward facing to rear facing.

5. An integrated infant safety car seat built into a bench seat in a vehicle;
- a segment of the bench seat has a seat bottom and a back;
- the seat bottom and the back are configured to support an infant, from a newborn to a toddler or under the age of eight;
- the seat bottom is permanently integrated with the bench seat below a seat surface of the bench seat;
- the back is permanently integrated with the bench seat behind a back surface of the bench seat;
- the seat bottom has a first upholstery that matches and smoothly integrates the seat with the bench seat;
- the seat bottom has a second upholstery that matches to smoothly integrate the back with the back surface of the bench seat;
- a first camera is directed to the back;
- a second camera is in a hasp of a harness of the integrated infant safety car seat;
- a screen is configured to be visible to a forward facing driver of the vehicle;
- the screen selectively shows an image from any of the cameras;
- a display is configured to be visible to the forward facing driver of the vehicle;
- the display has electronic and manual control signals;
- a safety feature is shown in the display;
- the seat includes an integral scale;
- harnesses with hasps are configured to secure an occupant of the seat bottom and are internally connected to the integrated infant safety car seat;
- the hasps each include a sensor to determine whether the hasps are fastened;
- a processor is connected to the display that determines whether the vehicle is in operation based on any of: a speedometer, a transmission or an engine computer;
- if the processor determines that the vehicle is not in operation, and the scale indicates to the display a preselected threshold weight, and the hasp sensors indicate fastened, then an alert is made;
- electronic signs of infant in seat bottom, and infant buckled are shown on the display;
- an infant in car notification, is shown in the display;
- an electronic button to un-buckle, is provided on the display;
- electronic control button in key fob is internally connected to the integrated infant safety car seat;
- the alert including, lights, intermittent lights, sounds, or a lullaby, are each individually or in conjunction configured to activate and de-activate according to status of the infant in the vehicle, the actions taken, and the control signs, internally connected to the infant safety car seat.

6. The integrated infant safety car seat in claim 5 further characterized in that an insert and paddings are provided that are adapted to fit within the back and seat bottom to reduce the available size of the back and seat bottom and configured to fit a smaller infant.

7. The integrated infant safety car seat in claim 6 further characterized in that the alert may further include, disabling of a vehicle system or a wireless message.

8. The integrated infant safety car seat in claim 7 further characterized in that the bench seat includes more than one integrated infant safety car seat.

9. The integrated infant safety car seat in claim 8 further characterized in that the seat and back are provided with a mechanized recline to convert the seat bottom from forward facing to rear facing, with headrest and footrests that also recline in different angles.

* * * * *